(12) United States Patent
Liao

(10) Patent No.: US 7,878,522 B2
(45) Date of Patent: Feb. 1, 2011

(54) VEHICLE WITH IMPROVED FLEXIBILITY

(75) Inventor: Ming-Chen Liao, Nantou (TW)

(73) Assignee: Joy Ride Tech. Co., Ltd., Nantou (TW)

( * ) Notice: Subject to any disclaimer, the term of this patent is extended or adjusted under 35 U.S.C. 154(b) by 1128 days.

(21) Appl. No.: 11/546,090

(22) Filed: Oct. 10, 2006

(65) Prior Publication Data

US 2008/0001374 A1  Jan. 3, 2008

(30) Foreign Application Priority Data

Jul. 3, 2006  (TW) .............................. 95124118 A

(51) Int. Cl.
*B62K 11/00* (2006.01)

(52) U.S. Cl. ...................... 280/282; 280/281.1; 280/221

(58) Field of Classification Search ................. 280/282, 280/281.1, 210, 295, 296, 220, 221, 87.04; 144/55.5–55.54
See application file for complete search history.

(56) References Cited

U.S. PATENT DOCUMENTS

| | | | | |
|---|---|---|---|---|
| 3,827,519 A * | 8/1974 | Snider | ...................... | 180/205 |
| 4,277,078 A * | 7/1981 | Root | ........................... | 280/269 |
| 4,540,192 A * | 9/1985 | Shelton | ....................... | 280/282 |
| 5,265,550 A * | 11/1993 | Harper, Jr. | ............... | 114/61.16 |
| 5,722,504 A * | 3/1998 | Gaetani | ....................... | 180/411 |
| 5,769,441 A * | 6/1998 | Namngani | .................. | 280/208 |
| 7,467,683 B2 * | 12/2008 | Malvestio | .................... | 180/266 |
| 2003/0070862 A1 * | 4/2003 | Tartara | ........................ | 180/411 |
| 2003/0214113 A1 * | 11/2003 | Bank | ........................... | 280/282 |
| 2007/0007745 A1 * | 1/2007 | Shim et al. | .................. | 280/282 |
| 2007/0205576 A1 * | 9/2007 | Lynch et al. | ................. | 280/282 |
| 2008/0258426 A1 * | 10/2008 | Kanou | ......................... | 280/282 |
| 2008/0277890 A1 * | 11/2008 | Boster et al. | .................. | 280/62 |
| 2009/0289437 A1 * | 11/2009 | Steinhilber | .................. | 280/282 |

FOREIGN PATENT DOCUMENTS

JP  48-27838  4/1973

* cited by examiner

*Primary Examiner*—Lesley Morris
*Assistant Examiner*—Tashiana Adams
(74) *Attorney, Agent, or Firm*—Ladas & Parry, LLP

(57) ABSTRACT

A vehicle includes a vehicle frame, a steering rod, a pair of arm units, and a drive unit. The steering rod is coupled rotatably to the vehicle frame. Each of the arm units is coupled pivotably to the vehicle frame. The drive unit is coupled to the arm units, and is operable so as to drive pivoting movement of the arm units relative to the vehicle frame.

7 Claims, 7 Drawing Sheets

VEHICLE WITH IMPROVED FLEXIBILITY

CROSS-REFERENCE TO RELATED APPLICATION

This application claims priority of Taiwanese application no. 095124118, filed on Jul. 3, 2006.

BACKGROUND OF THE INVENTION

1. Field of the Invention

This invention relates to a vehicle, more particularly to a vehicle that is both stable and agile.

2. Description of the Related Art

FIG. 1 illustrates a conventional bicycle that is known for its instability problem. To solve this problem, a tricycle, which is illustrated in FIG. 2, has been proposed. The tricycle, however, lacks the agility of the conventional bicycle.

SUMMARY OF THE INVENTION

Therefore, the object of the present invention is to provide a vehicle that is both stable and agile.

According to one aspect of the present invention, a vehicle comprises a vehicle frame assembly, a wheel unit, and a drive unit. The vehicle frame assembly includes a vehicle frame, a steering rod, and a pair of arm units. The steering rod is coupled rotatably to the vehicle frame. Each of the arm units is coupled pivotably to the vehicle frame. The wheel unit includes a front wheel and a pair of rear wheels. The front wheel is coupled to the steering rod. Each of the rear wheels is coupled pivotably to a respective one of the arm units. The drive unit is mounted on the vehicle frame, is coupled to the arm units, and is operable so as to drive pivoting movement of the arm units relative to the vehicle frame to result in movement of the rear wheels toward and away from each other.

According to another aspect of the present invention, a vehicle comprises a vehicle frame assembly, a ski unit, and a drive unit. The vehicle frame assembly includes a vehicle frame, a steering rod, and a pair of arm units. The steering rod is coupled rotatably to the vehicle frame. Each of the arm units is coupled pivotably to the vehicle frame. The ski unit includes a front ski and a pair of rear skis. The front ski is coupled to the steering rod. Each of the rear skis is coupled pivotably to a respective one of the arm units. The drive unit is mounted on the vehicle frame, is coupled to the arm units, and is operable so as to drive pivoting movement of the arm units relative to the vehicle frame to result in movement of the rear skis toward and away from each other.

According to yet another aspect of the present invention, a vehicle comprises a vehicle frame assembly, a pontoon unit, and a drive unit. The vehicle frame assembly includes a vehicle frame, a steering rod, and a pair of arm units. The steering rod is coupled rotatably to the vehicle frame. Each of the arm units is coupled pivotably to the vehicle frame. The pontoon unit includes a front pontoon and a pair of rear pontoons. The front pontoon is coupled to the steering rod. Each of the rear pontoons is coupled pivotably to a respective one of the arm units. The drive unit is mounted on the vehicle frame, is coupled to the arm units, and is operable so as to drive pivoting movement of the arm units relative to the vehicle frame to result in movement of the rear pontoons toward and away from each other.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
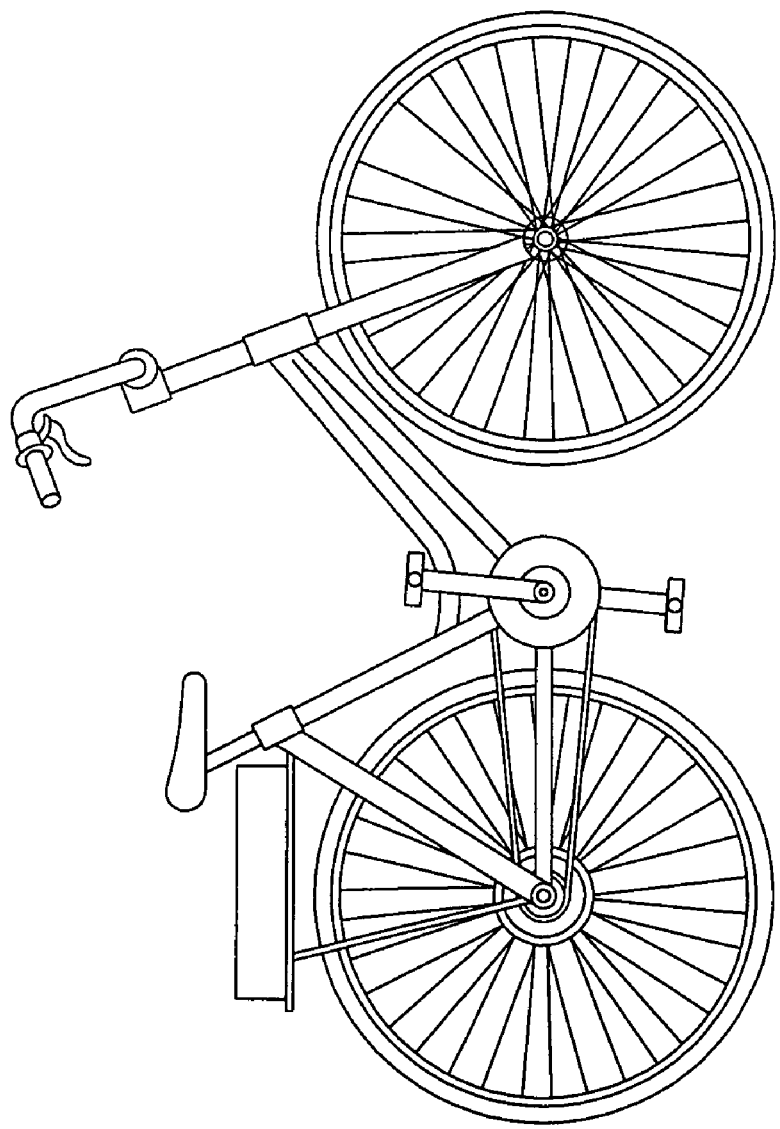
FIG. 1 is a schematic view of a conventional bicycle.
Figure 2:
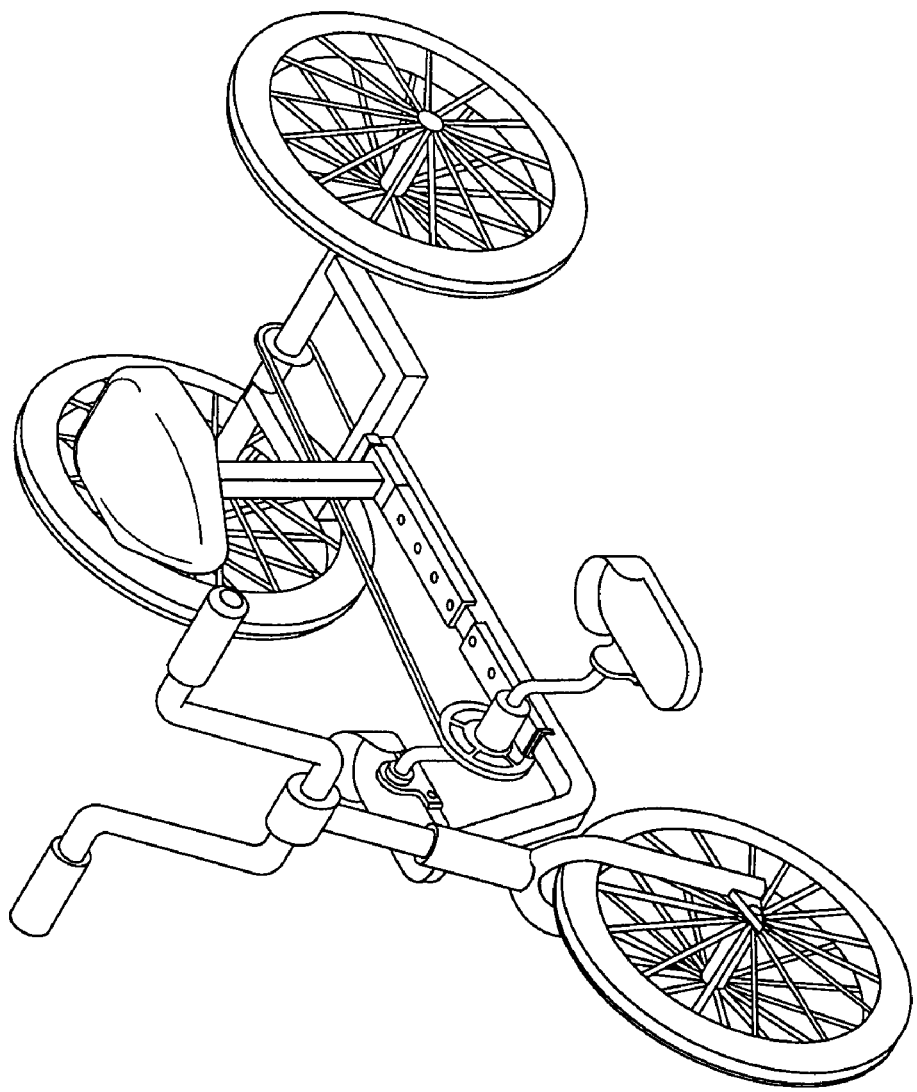
FIG. 2 is a perspective view of a conventional tricycle.

Before the present invention is described in greater detail, it should be noted that like elements are denoted by the same reference numerals throughout the disclosure.

Figure 3:
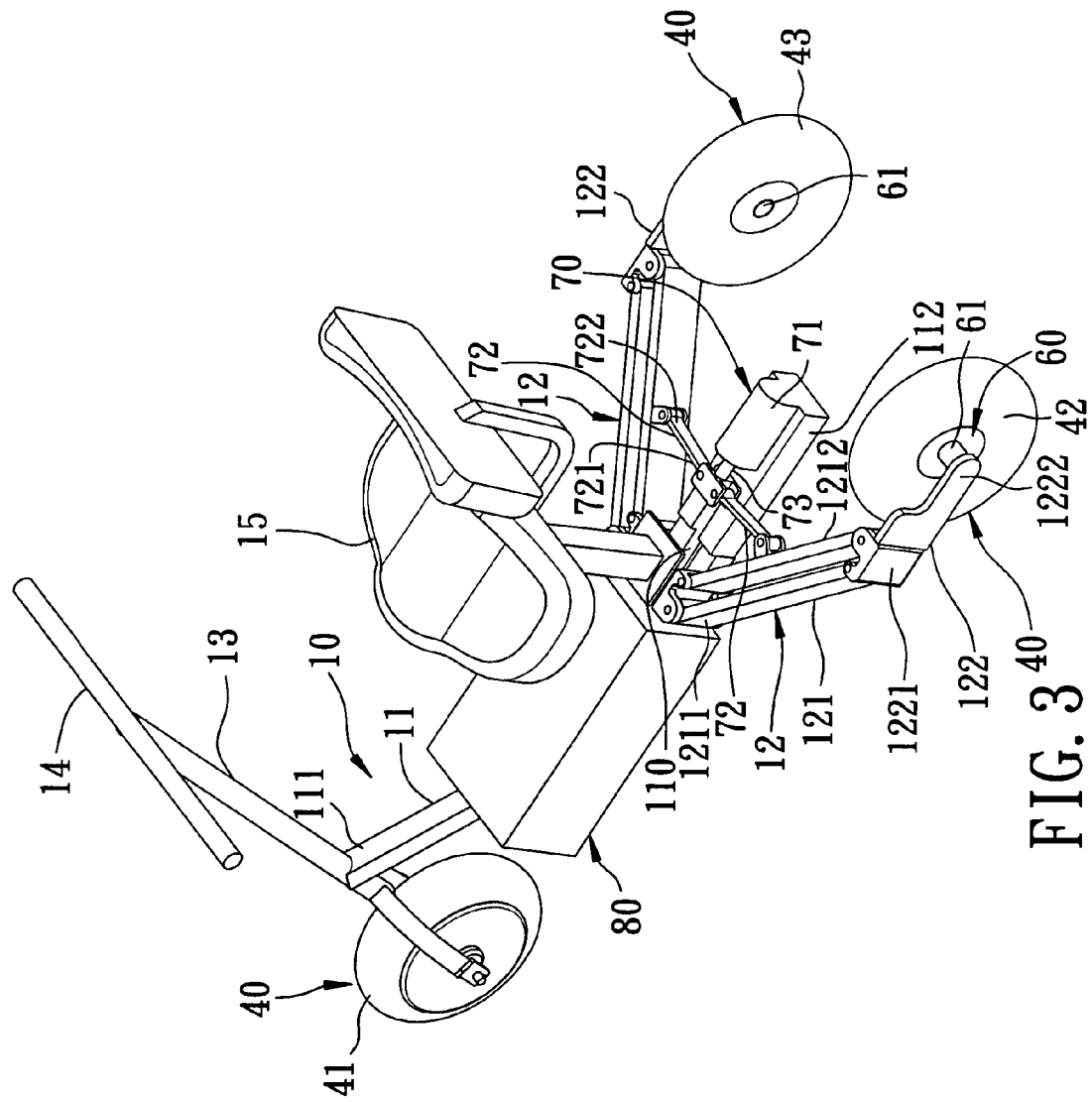
FIG. 3 is a perspective view of the first preferred embodiment of a vehicle according to the present invention.

Referring to FIG. 3, the first preferred embodiment of a vehicle according to this invention is shown to include a vehicle frame assembly 10, a wheel unit 40, and a drive unit 70.

The vehicle of this embodiment is suitable for road travel.

The vehicle frame assembly 10 includes a vehicle frame 11, a steering rod 13, and a pair of arm units 12.

The vehicle frame 11 has opposite first and second ends 111, 112.

The steering rod 13 is coupled rotatably to the first end 111 of the vehicle frame 11.

Each of the arm units 12 includes first and second arms 121, 122. The first arm 121 of each of the arm units 12 has a first end 1211 that is coupled pivotably to the vehicle frame 11 at a position between the first and second ends 111, 112 of the vehicle frame 11, and a second end 1212 that is opposite to the first end 1211 of the first arm 121 of the respective one of the arm units 12. The second arm 122 of each of the arm units 12 has a first end 1221 that is coupled pivotably to the second end 1212 of the first arm 121 of the respective one of the arm units 12, and a second end 1222 that is opposite to the first end 1221 of the second arm 122 of the respective one of the arm units 12.

The wheel unit 40 includes a front wheel 41, and a pair of rear wheels 42, 43 that are aligned in a first direction. The front wheel 41 of the wheel unit 40 is coupled to the steering rod 13. Each of the rear wheels 42, 43 of the wheel unit 40 is coupled to the second end 1222 of the second arm 122 of the respective one of the arm units 12.

The drive unit 70 includes a lifting motor 71, and a slider 73 driven by the lifting motor 71. The lifting motor 71 of the drive unit 70 is mounted on the second end 112 of the vehicle frame 11. The slider 73 of the drive unit 70 has a first end portion that is movable in a second direction transverse to the first direction toward and away from the front wheel 41, and a second end portion that is opposite to the first end portion thereof. The drive unit 70 is operable between a first mode, where the second end portion of the slider 73 is moved in the second direction away from the front wheel 41, and a second mode, where the second end portion of the slider 73 is moved in the second direction toward the front wheel 41. Each of a pair of levers 72 has a first end that is coupled pivotably to the second end portion of the slider 73, and a second end that is coupled pivotably to the first arm 121 of a respective one of the arm units 12 at a position between the first and second ends 1211, 1212 of the first arm 121 of the respective one of the arm units 12.

Figure 4:
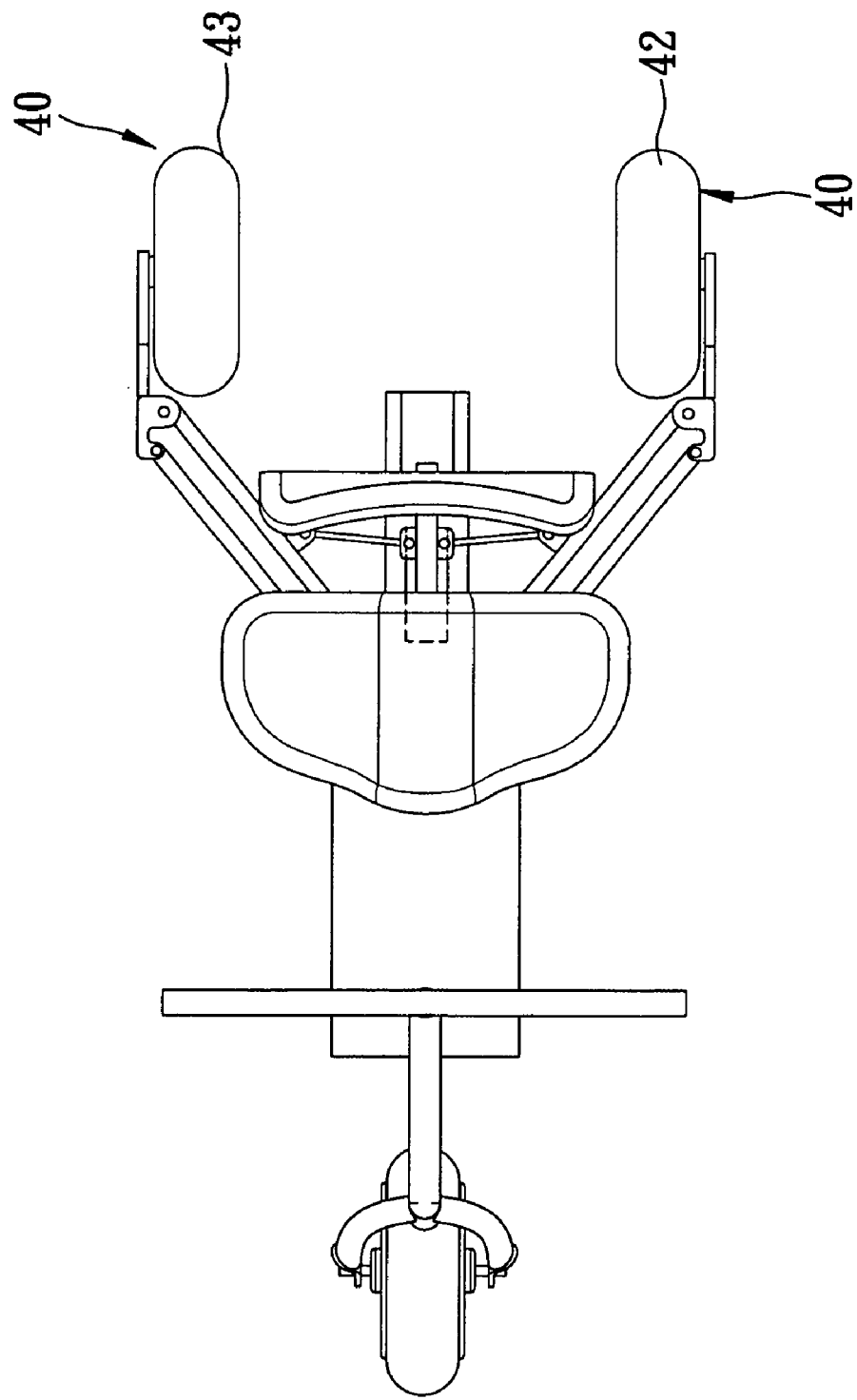
FIG. 4 is a schematic top view to illustrate a state where a drive unit of the first preferred embodiment is operated in a first mode.
Figure 5:
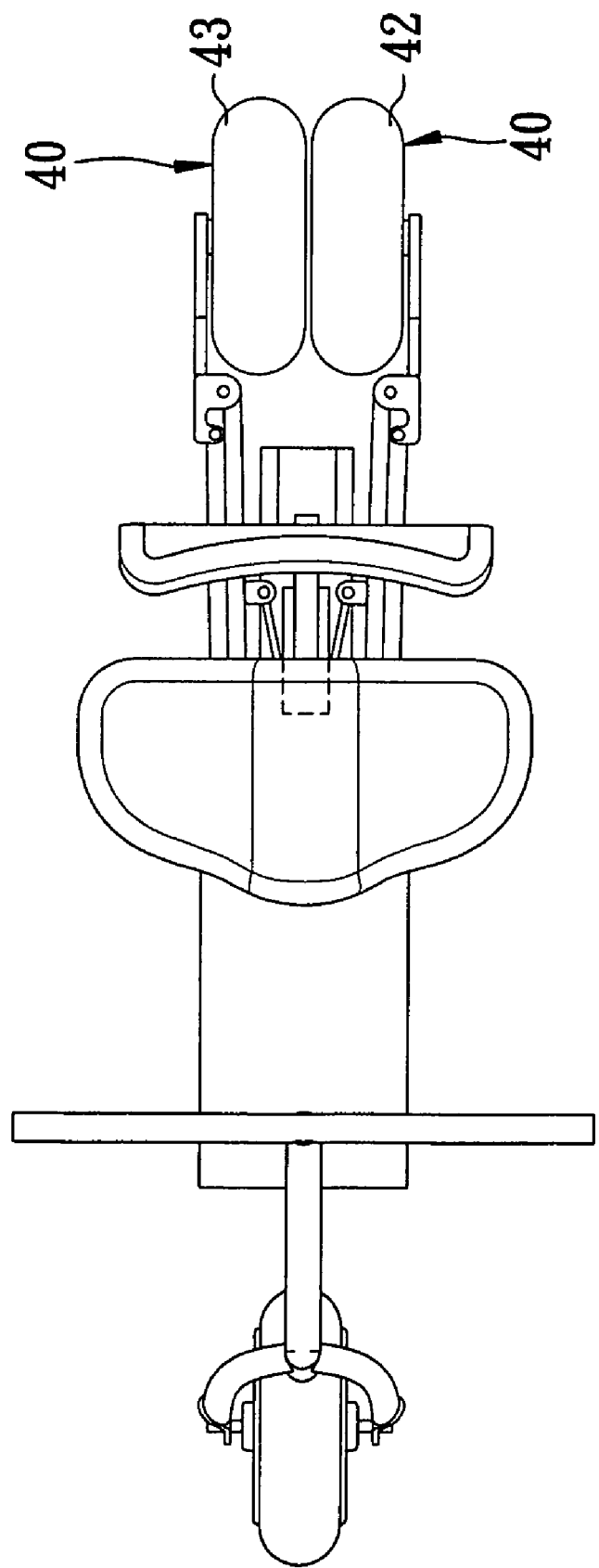
FIG. 5 is a schematic top view to illustrate anoter state where the drive unit of the first preferred embodiment is operated in a second mode.

From the above description, when the drive unit 70 is operated in the first mode, each of the levers 72 is driven by the slider 73 to push the first arm 121 of the respective one of the arm units 12, which, in turn, results in outward pivoting movement of the first arms 121 of the arm units 12 relative to the vehicle frame 11 to thereby move the second ends 1212 of the first arms 121 of the arm units 12 together with the rear wheels 42, 43 away from each other. In this mode, as best shown in FIG. 4, the rear wheels 42, 43 of the wheel unit 40 are disposed apart from each other. Furthermore, when the drive unit 70 is operated in the second mode, each of the levers 72 is driven by the slider 73 to pull the first arm 121 of the respective one of the arm units 12, which, in turn, results in inward pivoting movement of the first arms 121 of the arm units 12 relative to the vehicle frame 11 to thereby move the second ends 1212 of the first arms 121 of the arm units 12 together with the rear wheels 43 toward each other. In this mode, as best shown in FIG. 5, the rear wheels 42, 43 of the wheel unit 40 are disposed adjacent to each other.

The vehicle further includes an engine unit 60 for driving rotation of the front and rear wheels 41, 42, 43. In this embodiment, the engine unit 60 includes a pair of hub motors 61, each of which is mounted on the second end 1222 of the second arm 122 of a respective one of the arm units 12 of the vehicle frame assembly 10. Since the construction and operation of the hub motors 61 are known to those skilled in the art, a detailed description of the same will be dispensed with herein for the sake of brevity.

It is noted that the vehicle frame 11 is formed with a rail groove 110 therein, and the slider 73 of the drive unit 70 is disposed slidably in the rail groove 110 in the vehicle frame 11.

The vehicle further includes a steering handle 14 that is coupled to the steering rod 13, a driver seat 15 that is mounted on the vehicle frame 11 at a position between the first and second ends 111, 112 of the vehicle frame 11, and a power source 80 that is mounted on the vehicle frame 11 at a position between the first and second ends 111, 112 of the vehicle frame 11, and that is coupled electrically to the drive unit 70 and the engine unit 60, thereby permitting the power source 80 to supply power to the drive unit 70 and the engine unit 60.

When starting the vehicle, the vehicle is less stable and the driver can easily lose his/her balance. At this time, the drive unit 70 may be operated in the first mode to thereby enhance stability of the vehicle for helping the driver to maintain balance. When a faster speed is reached, the vehicle becomes more stable and the driver can easily maintain his/her balance. At this time, the lifting motor 71 of the drive unit 70 may be operated in the second mode to thereby enhance agility of the vehicle for helping the driver to have better control of the vehicle. When the vehicle slows down, the vehicle again becomes less stable. At this time, the lifting motor 71 of the drive unit 70 may be operated back to the first mode.

Figure 6:
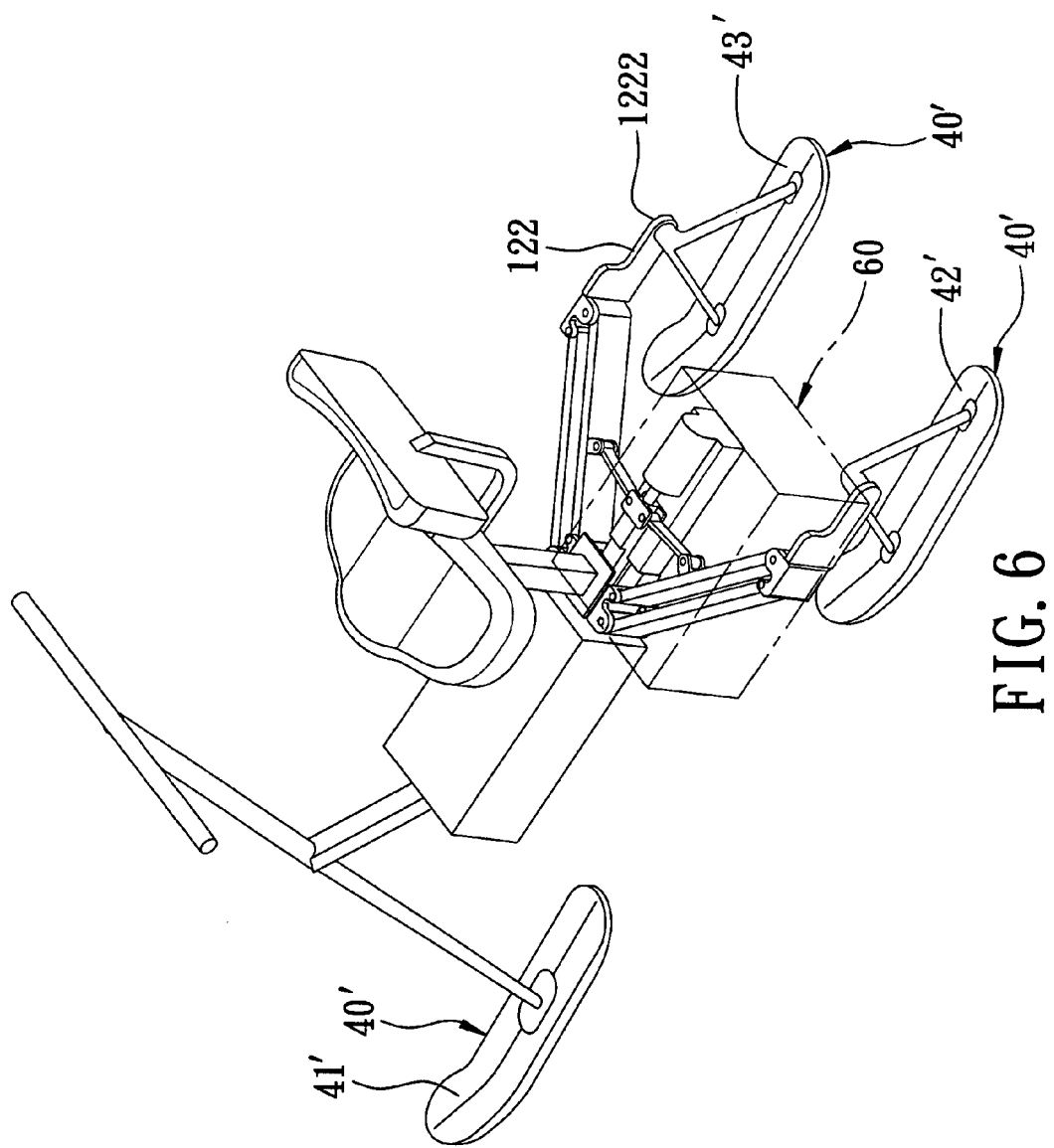
FIG. 6 is a perspective view of the second preferred embodiment of a vehicle according to the present invention.

FIG. 6 illustrates the second preferred embodiment of a vehicle according to this invention. When compared with the previous embodiment, the vehicle is suitable for traveling on snow (not shown). In particular, the vehicle includes a ski unit 40'. The ski unit 40' includes a front ski 41' that is coupled securely to the steering rod 13, and a pair of rear skis 42', 43', each of which is coupled securely to the second end 1222 of the second arm 122 of a respective one of the arm units 12. The engine unit 60 is mounted on the vehicle frame 11 of the vehicle frame assembly 10 for propelling the vehicle frame assembly 10 on snow.

Figure 7:
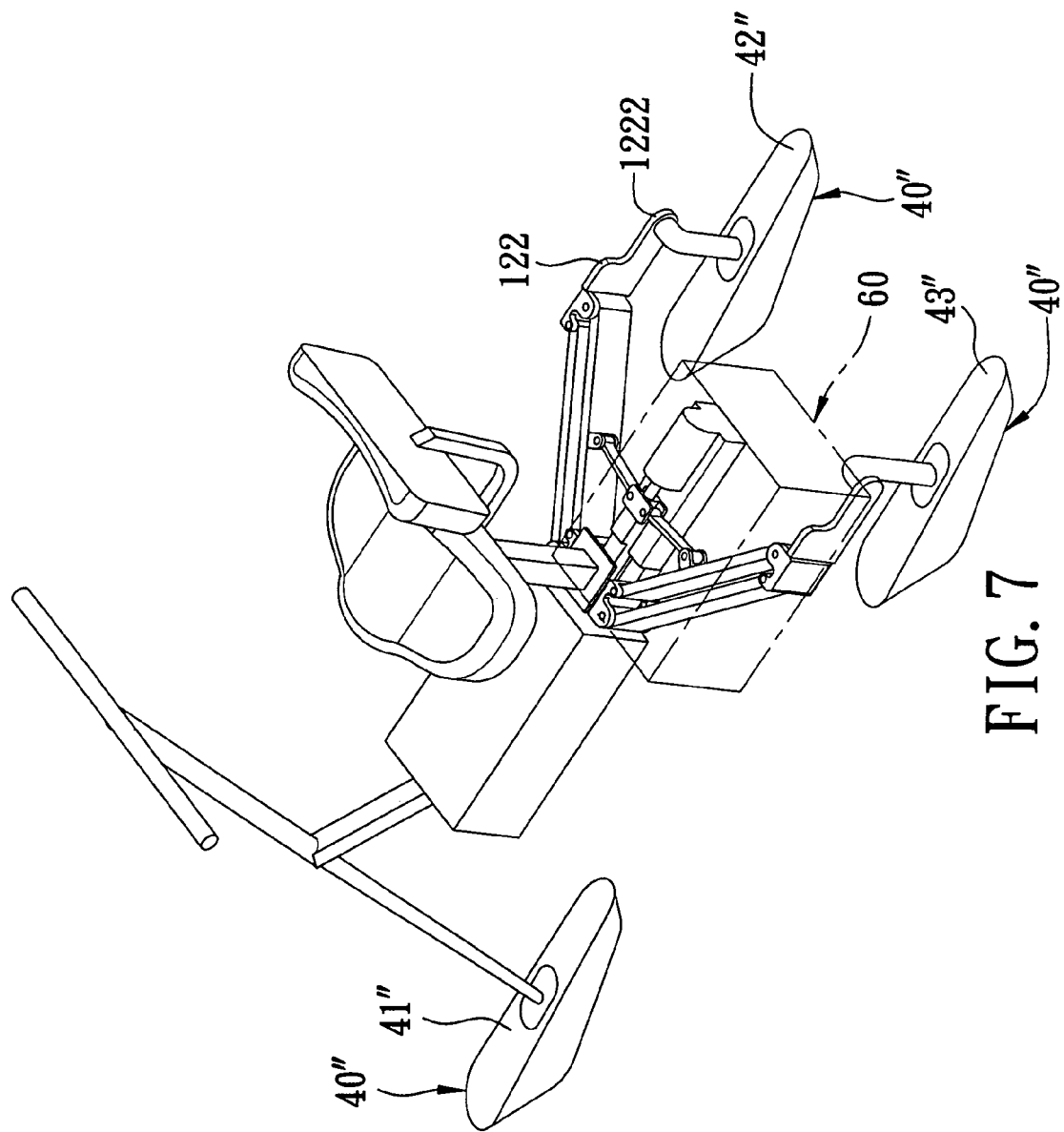
FIG. 7 is a perspective view of the third preferred embodiment of a vehicle according to the present invention.

FIG. 7 illustrates the third preferred embodiment of a vehicle according to this invention. When compared with the first embodiment, the vehicle is suitable for traveling on water (not shown). In particular, the vehicle includes a pontoon unit 40". The pontoon unit 40" includes a front pontoon 41" that is coupled securely to the steering rod 13, and a pair of rear pontoons 42", 43", each of which is coupled securely to the second end 1222 of the second arm 122 of a respective one of the arm units 12. The engine unit 60 is mounted on the vehicle frame 11 of the vehicle frame assembly 10 for propelling the vehicle frame assembly 10 on water.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A vehicle, comprising:
   a vehicle frame assembly including
      a vehicle frame,
      a steering rod coupled rotatably to said vehicle frame, and
      a pair of arm units, each of which is coupled pivotably to said vehicle frame;
   a wheel/pontoon/ski unit including
      a front wheel, pontoon, or ski that is coupled to said steering rod, and
      a pair of rear wheels, pontoons, or skis, each of which is coupled pivotably to a respective one of said arm units; and
   a drive unit mounted on said vehicle frame, coupled to said arm units, and operable so as to drive pivoting movement of said arm units relative to said vehicle frame to result in movement of said rear wheels, pontoons, or skis toward and away from each other;
   wherein each of said arm units includes a first arm that is coupled pivotably to said vehicle frame, each of said rear wheels, pontoons, or skis of said wheel/pontoon/ski unit being coupled pivotably to said first arm of the respective one of said arm units; and
   wherein said rear wheels, pontoons, or skis are aligned in a first direction, said drive unit including a lifting motor, and a slider that is driven by said lifting motor and that is movable in a second direction transverse to the first direction, said vehicle further including a pair of levers, each of which is coupled pivotably to said slider and is coupled pivotably to said first arm of a respective one of said arm units so that said rear wheels, pontoons, or skis are moved toward each other when said slider is moved in the second direction toward said front wheel, pontoon, or ski and so that said rear wheels, pontoons, or skis are moved away from each other when said slider is moved in the second direction away from said front wheel, pontoon, or ski.

2. The vehicle as claimed in claim 1, wherein said vehicle frame is formed with a rail groove therein, said slider of said drive unit being disposed slidably in said rail groove in said vehicle frame.

3. The vehicle as claimed in claim 1, further comprising an engine unit mounted on said vehicle frame assembly for driving rotation of said front and rear wheels.

4. The vehicle as claimed in claim 3, wherein said engine unit includes a hub motor.

5. The vehicle as claimed in claim 1, wherein each of said arm units further includes a second arm that is coupled to and horizontally pivotable relative to said first arm of the respective one of said arm units, each of said rear wheels, pontoons, or skis of said wheel/pontoon/ski unit being coupled pivotably to said first arm of the respective one of said arm units through said second arm of the respective one of said arm units.

6. The vehicle as claimed in claim 1, further comprising an engine unit mounted on said vehicle frame assembly for propelling said vehicle frame assembly on snow.

7. The vehicle as claimed in claim 1, further comprising an engine unit mounted on said vehicle frame assembly for propelling said vehicle frame assembly on water.

* * * * *